US011447652B2

(12) United States Patent
Behabtu et al.

(10) Patent No.: US 11,447,652 B2
(45) Date of Patent: Sep. 20, 2022

(54) POLYSACCHARIDE COATINGS WITH OXYGEN BARRIER PROPERTIES

(71) Applicant: NUTRITION & BIOSCIENCES USA 4, INC., Rochester, NY (US)

(72) Inventors: Natnael Behabtu, Wilmington, DE (US); Christian Peter Lenges, Wilmington, DE (US); James Joshua Ohane, West Chester, PA (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 222 days.

(21) Appl. No.: 16/607,944

(22) PCT Filed: Apr. 24, 2018

(86) PCT No.: PCT/US2018/029013
§ 371 (c)(1),
(2) Date: Oct. 24, 2019

(87) PCT Pub. No.: WO2018/200437
PCT Pub. Date: Nov. 1, 2018

(65) Prior Publication Data
US 2021/0095155 A1    Apr. 1, 2021

Related U.S. Application Data

(60) Provisional application No. 62/489,652, filed on Apr. 25, 2017.

(51) Int. Cl.
| | | |
|---|---|---|
| *C09D 105/00* | (2006.01) | |
| *C08J 7/04* | (2020.01) | |
| *C08J 7/048* | (2020.01) | |
| *B65D 65/42* | (2006.01) | |
| *C08B 37/00* | (2006.01) | |
| *C09D 5/00* | (2006.01) | |
| *C08L 5/00* | (2006.01) | |
| *B32B 33/00* | (2006.01) | |
| *B65D 75/26* | (2006.01) | |

(52) U.S. Cl.
CPC ............ *C09D 105/00* (2013.01); *B32B 33/00* (2013.01); *B65D 65/42* (2013.01); *B65D 75/26* (2013.01); *C08B 37/0009* (2013.01); *C08J 7/042* (2013.01); *C08J 7/048* (2020.01); *C08J 7/0427* (2020.01); *C08L 5/00* (2013.01); *C09D 5/00* (2013.01); *B32B 2307/7244* (2013.01); *C08J 2300/00* (2013.01); *C08J 2367/02* (2013.01); *C08J 2405/00* (2013.01)

(58) Field of Classification Search
CPC . B32B 33/00; B32B 2307/7244; B65D 65/42; B65D 75/26; C08B 37/0009; C08J 7/0427; C08J 7/048; C08J 7/042; C08J 2367/02; C08J 2405/00; C08J 2300/00; C08L 5/00; C09D 105/00; C09D 5/00
See application file for complete search history.

(56) References Cited

U.S. PATENT DOCUMENTS

| | | |
|---|---|---|
| 6,692,801 B1 | 2/2004 | Berlin et al. |
| 7,000,000 B1 | 2/2006 | O'Brien |
| 7,452,592 B2 | 11/2008 | Cowton |
| 7,521,103 B2 | 4/2009 | Posey |
| 8,409,679 B2 | 4/2013 | Bentmar et al. |
| 8,642,757 B2 | 2/2014 | O'Brien et al. |
| 9,080,195 B2 | 7/2015 | O'Brien et al. |
| 9,139,718 B2 | 9/2015 | Paullin et al. |
| 9,278,988 B2 | 3/2016 | Kasat et al. |
| 2011/0135912 A1 | 6/2011 | Xu |
| 2017/0029601 A1 | 2/2017 | McCaffrey |

FOREIGN PATENT DOCUMENTS

| | | |
|---|---|---|
| JP | 5515312 B2 | 8/2010 |
| WO | 2011005181 A1 | 1/2011 |
| WO | 2015095358 A1 | 6/2015 |
| WO | 2015109066 A1 | 7/2015 |
| WO | 2015195960 A1 | 12/2015 |
| WO | 2016106068 A1 | 6/2016 |

OTHER PUBLICATIONS

International Preliminary Report on Patentability for PCT/US2018/29013 dated Oct. 29, 2019.

*Primary Examiner* — Patrick D Niland

(57) ABSTRACT

Disclosed herein are coated articles comprising a substrate having at least one surface, and a coating composition disposed in a substantially continuous layer on at least one surface of the substrate, wherein the coating composition is present in an amount sufficient to increase the oxygen barrier property of the substrate, and the coating composition comprises a polysaccharide derivative. The polysaccharide derivative can comprise a poly alpha-1,3-glucan ether compound, such as a quaternary ammonium alpha-1,3-glucan ether. Also disclosed is packaging comprising the coated article.

16 Claims, No Drawings

POLYSACCHARIDE COATINGS WITH OXYGEN BARRIER PROPERTIES

CROSS-REFERENCE TO RELATED APPLICATIONS

This application is the National Stage application of International Application No. PCT/US18/29013 (filed Apr. 24, 2018), which claims priority to U.S. Provisional Application No. 62/489,652 (filed Apr. 25, 2017), the disclosures of which prior applications are incorporated herein by reference in their entirety.

FIELD OF THE DISCLOSURE

The present disclosure is directed to coating compositions that can provide oxygen barrier properties for substrates, for example paper, textile, and polymeric substrates. The coating compositions comprise a polysaccharide derivative such as a poly alpha-1,3-glucan ether compound, and can form a substantially continuous layer on at least one surface of the substrate. Articles comprising the coated substrates can be useful for food packaging applications and may be easily recycled.

BACKGROUND

The paper and packaging industry utilizes many types of coating compositions for various substrates, including cellulosic substrates such as paper, depending upon their final use. In some methods, the paper surface can be coated with a polymer, for example polyethylene, or treated with finishes such as fluorocarbon polymers. Paper coated with synthetic polymers tends to be difficult to recycle. There is a continuing need for packaging material which has good oxygen barrier properties and contains materials that are made from renewable resources. There remains a need for packaging material which has good oxygen barrier properties and is able to be recycled. There is a need for packaging material which has good oxygen barrier properties even under conditions of relatively high humidity.

SUMMARY

The disclosure relates to coated articles having an improved oxygen barrier property, and to the coating compositions used to coat the articles. In one embodiment, a coated article is disclosed, the coated article comprising:

a substrate having at least one surface; and a coating composition disposed in a substantially continuous layer on at least one surface of the substrate, wherein the coating composition is present in an amount sufficient to increase the oxygen barrier property of the substrate, and the coating composition comprises a polysaccharide derivative.

In one embodiment, the substrate is paper, a polymer, leather, or a textile. In one embodiment, the substrate is paper. In one embodiment, the substrate is a polymer. In another embodiment, the substrate is a polymer, and the polymer comprises polyethylene, polypropylene, poly lactic acid, poly(ethylene terephthalate), poly(trimethylene terephthalate), polyamide, or poly(trimethylene furandicarboxylate). In yet another embodiment, the layer of coating composition forms a dried layer having a thickness in the range of from 0.1 micrometers to 50 micrometers. In a further embodiment, the oxygen barrier property is increased by at least 10% relative to that of the corresponding uncoated substrate. In yet a further embodiment, the oxygen transmission rate of the coated article is decreased by at least 10% relative to that of the corresponding uncoated substrate.

In another embodiment, the polysaccharide derivative comprises a poly alpha-1,3-glucan ether compound represented by the structure:

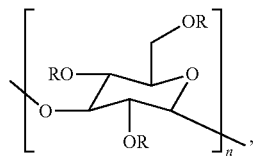

wherein
(i) n is at least 6,
(ii) each R is independently an H or an organic group, and
(iii) the compound has a degree of substitution of about 0.05 to about 3.0.

In one embodiment, at least one organic group comprises a hydroxymethyl, a hydroxyethyl, or a hydroxypropyl group.

In a further embodiment, the organic group is a positively charged organic group. In one embodiment, at least one positively charged organic group comprises a substituted ammonium group. In another embodiment, the positively charged organic group comprises a trimethylammonium group. In yet another embodiment, the positively charged organic group is a quaternary ammonium group. In one embodiment, at least one positively charged organic group comprises an alkyl group or hydroxy alkyl group. In another embodiment, at least one positively charged organic group is a quaternary ammonium hydroxypropyl group.

In another embodiment, the polysaccharide derivative comprises a poly alpha-1,3-glucan ester compound. In an additional embodiment, the polysaccharide derivative is obtained from an enzymatically-produced polysaccharide.

In one embodiment, the coated article further comprises an adhesive layer disposed between the coating composition and the substrate. In another embodiment, the coating composition further comprises one or more additives.

Also disclosed herein is packaging comprising the coated article; a packaged article comprising the packaging; and a packaged article comprising the packaging, wherein the package article is food.

DETAILED DESCRIPTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "polysaccharide" means a polymeric carbohydrate molecule composed of long chains of monosaccharide units bound together by glycosidic linkages and on hydrolysis give the constituent monosaccharides or oligosaccharides.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The term "starch" means a polymeric carbohydrate consisting of amylose and amylopectin.

The term "hydroxyalkyl starch" means an ether derivative of partially hydrolyzed natural starches, in which hydroxyl groups in the starch are hydroxyl alkylated.

The terms "fabric", "textile", and "cloth" are used interchangeably herein to refer to a woven material having a network of natural and/or artificial fibers. Such fibers can be thread or yarn, for example.

The terms "water soluble" or "water dispersible" means that the polysaccharide or polysaccharide derivative is soluble at 1% by weight or higher in pH 7 water at 25° C. The percentage by weight is based on the total weight of the polysaccharide soluble in water, for example, 1 gram of polysaccharide in 100 grams of water.

The phrase "poly alpha-1,3-glucan" means a polysaccharide comprising glucose monomer units linked together by glycosidic linkages wherein at least 50% of the glycosidic linkages are α-1,3-glycosidic linkages. In other embodiments, the percentage of α-1,3-glycosidic linkages can be greater than or equal to 90%, 95%, 96%, 97%, 98%, 99% or 100% (or any integer value between 50% and 100%). Accordingly, the α-(1,3→glucan) polymer comprises less than or equal to 10%, 5%, 4%, 3%, 2%, 1% or 0% of glycosidic linkages that are not α-1,3-glycosidic linkages. The α-(1,3→glucan) polymer also has a number average degree of polymerization in the range of from 10 to 600,000, for example 55 to 10,000 or 200 to 600,000.

The terms "glycosidic linkage" refers to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. The term "alpha-1,6-glycosidic linkage" as used herein refers to the covalent bond that joins alpha-D-glucose molecules to each other through carbons 1 and 6 on adjacent alpha-D-glucose rings. Herein, "alpha-D-glucose" will be referred to as "glucose".

The glycosidic linkage profile of a glucan or substituted glucan can be determined using any method known in the art. For example, a linkage profile can be determined using methods that use nuclear magnetic resonance (NMR) spectroscopy (e.g., $^{13}C$ NMR or $^{1}H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The term "alkyl group", as used herein, refers to linear, branched, and cyclic hydrocarbon groups containing from 1 to 20 carbons and containing no unsaturation. Examples of straight chain alkyl radicals include methyl, ethyl, propyl, butyl, pentyl, hexyl, heptyl, octyl, nonyl, decyl, undecyl, and dodecyl. Examples of branched chain isomers of straight chain alkyl groups include isopropyl, iso-butyl, tert-butyl, sec-butyl, isopentyl, neopentyl, isohexyl, neohexyl, and isooctyl. Examples of cyclic alkyl groups include cyclopropyl, cyclobutyl, cyclopentyl, cyclohexyl, cycloheptyl, and cyclooctyl.

As used herein, "weight average molecular weight" or "$M_w$" is calculated as $M_w=\Sigma N_i M_i^2/\Sigma N_i M_i$; where $M_i$ is the molecular weight of a chain and $N_i$ is the number of chains of that molecular weight. The weight average molecular weight can be determined by technics such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n=\Sigma N_i M_i/\Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

The phrase "coating composition" refers to all of the solid components that form the layer on the substrate, for example, the polysaccharide derivative, as well as optional additives such as pigment, surfactant, dispersing agent, binder, and/or crosslinking agent. The term solid is used even though some of the components may be liquids at or below room temperature.

The coating composition can be formulated with water, with an organic solvent, or with a mixture of water and an organic solvent. The phrase "aqueous coating composition" refers to the coating composition further comprising an aqueous carrier. In some embodiments, the aqueous carrier is water. In other embodiments, the aqueous carrier can be a mixture of water and a water-miscible organic solvent. The phrase "coating composition solution" refers to the coating composition further comprising an organic carrier. In some embodiments, the organic carrier is an organic solvent or a mixture of organic solvents. After being applied to a substrate, at least a portion of the water of the aqueous coating composition, or the organic solvent of the coating composition solution, is removed to form the layer of the coating composition on the substrate. Removing at least a portion of the aqueous or organic carrier means to remove greater than or equal to 50% by weight of the aqueous or organic carrier.

In other embodiments, greater than or equal to 90% or 95% or 99% by weight of the aqueous or organic carrier is removed. Water content can be assessed by Karl Fischer titration.

The phrase "consists essentially of" means that the composition contains all of the recited components and less than 5% by weight, based on the total weight of the composition of any other component or combination of components. For example, a composition consisting essentially of A and B must contain at least 95% by weight of A and B and no more than 5% by weight of any other component or combination components, wherein the percentage by weight is based on the total weight of the composition. In other embodiments, the phrase consisting essentially of means that the composition contains less than 4% or 3% or 2% or 1% or less than 0.5% by weight of the components that are not recited, based on the total weight of the composition.

The present disclosure is directed to a coated article comprising:

a substrate having at least one surface; and a coating composition disposed in a substantially continuous layer on at least one surface of the substrate, wherein the coating composition is present in an amount sufficient to increase the oxygen barrier property of the substrate, and the coating composition comprises a polysaccharide derivative.

The coated articles disclosed herein can be useful in packaging, for example in packaging of perishable materials such as food. Coated articles as disclosed herein can be used in packaging such as containers, lids, bags, stretch-wraps, films, paper cartons, canisters, pouches, plastic bottles, and bags. Coated articles as disclosed herein can be used to make films and/or multilayer composite films, for example for packaging. The packaging may comprise the coated article as at least one multilayer or as a sandwich structure, for example. It is desired that packaging for food or other perishable items provides a sufficient barrier to gases such as oxygen. As many commonly used film substrates, for example polyolefins such as polypropylene, do not provide good gas barrier properties, it is often desirable or necessary to coat such a film with a coating composition to enhance or provide the desired properties, such as oxygen barrier properties. Often, it is also desirable to use packaging materials having good oxygen barrier properties and which can be recycled. It can also be desirable to use packaging materials having good oxygen barrier properties, such as low oxygen transmission rate, under conditions of high relative humidity, for example at 50% and 80% relative humidity.

The coated articles disclosed herein comprise a substrate having at least one surface. The substrate can be in any useful form, for example the form of a two-dimensional object such as a sheet, or a three-dimensional object such as a cup, bowl, or other container.

The substrate can be any substrate for which improved oxygen barrier properties are desired. In some embodiments, the substrate can be a porous substrate such as paper, textiles, or leather. By "leather" is meant material made from the skin of an animal by tanning or a similar process. In some embodiments, the substrate can be paper, cardboard, paperboard, corrugated board, a cellulosic substrate, a textile, or leather. In other embodiments, the substrate can be a hard material such as wood, metal, or masonry. By "masonry" is meant the stone, brick, or concrete used to form walls or buildings. In additional embodiments, the substrate can be a polymer. In one embodiment, the substrate can be a polymer such as polyamide, polyolefin, polylactic acid, polyethylene terephthalate (PET), poly(trimethylene terephthalate) (PTT), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), polyethylene, polypropylene, poly(cyclic olefins), poly(cyclohexylene dimethylene terephthalate), poly(ethylene furandicarboxylate) (PEF), poly(trimethylene furandicarboxylate) (PTF), and cellophane. In one embodiment, the substrate is a polymer, and the polymer comprises polyethylene, polypropylene, poly lactic acid, poly(ethylene terephthalate), poly(trimethylene terephthalate), polyamide, or poly(trimethylene furandicarboxylate). In one embodiment, the substrate is paper, a polymer, leather, or a textile. In one embodiment, the substrate is paper, a polymer, or a textile. In one embodiment, the substrate is paper. In one embodiment, the substrate is a textile. In one embodiment, the substrate is a polymer. In one embodiment, the substrate is a polymer comprising polyethylene. In another embodiment, the substrate is a polymer comprising polypropylene. In a further embodiment, the substrate is a polymer comprising poly lactic acid. In yet another embodiment, the substrate is a polymer comprising poly(ethylene terephthalate). In yet another embodiment, the substrate is a polymer comprising poly(trimethylene terephthalate). In an additional embodiment, the substrate is a polymer comprising polyamide. In another embodiment, the substrate is a polymer comprising poly(trimethylene furandicarboxylate).

In one embodiment, the coating composition is disposed in a substantially continuous layer on at least one surface of the substrate. In another embodiment, the coating composition is disposed in a substantially continuous layer on more than one surface of the substrate. The phrase "substantially continuous layer" means a layer of a composition applied to at least a portion of a substrate, wherein a dried layer of the composition covers greater than or equal to 99% of the surface to which it has been applied and having less than 1% voids in the layer that expose the substrate surface. The greater than or equal to 99% of the surface to which the layer has been applied excludes any area of the substrate to which the layer has not been applied. For example, a continuous layer can be applied to only a portion of a substrate and still be considered a continuous layer to the area which the layer has been applied. A layer of the dried coating composition forms a continuous layer of individual polymeric macromolecules. It is believed that the individual macromolecules are interconnected by chain entanglement. Therefore, a continuous layer of the coating composition can also be characterized as continuous by forming a free-standing layer and stretching the sample.

The coating composition can be applied to the substrate to provide a dried coating layer having a thickness in the range of from about 0.1 micrometers ($\mu$m) to about 50 $\mu$m, or from about 0.5 $\mu$m to about 40 $\mu$m, or from about 1 $\mu$m to about 30 $\mu$m, or from about 1 $\mu$m to about 20 $\mu$m. Alternatively, the thickness of the dried coating layer can be at least about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 $\mu$m. If desired, the dried coating layer can have thickness greater than 50 $\mu$m. Thickness can be measured as described in the Examples.

The coating composition is present on at least one surface of the substrate in an amount sufficient to increase the oxygen barrier property of the substrate. In one embodiment, the oxygen barrier property of the substrate, when coated with a coating composition as disclosed herein to provide a coated article, is increased by at least 10% relative to that of the corresponding uncoated substrate. Alternatively, the oxygen barrier property of the substrate, when coated with a coating composition as disclosed herein to provide a coated article, is increased by at least 10%, 11%, 12%, 13%, 14%, 15%, 16%, 17%, 18%, 19%, or 20% relative to the corresponding uncoated substrate. In some embodiments, the oxygen barrier property of the substrate, when coated with a coating composition as disclosed herein, is increased by at least 25%, or at least 30%, or at least 35%, or at least 40%, or at least 45%, or at least 50%, or by greater than 50% relative to the corresponding uncoated substrate. By "corresponding uncoated substrate" is meant a substrate of the same composition and thickness but without a coating composition, for which the oxygen barrier property is measured in the same way as for a coated substrate. Oxygen barrier properties can be determined by methods known in the art, for example as oxygen transmission rate according to ASTM F1927-07 using an OX-TRAN® model testing system, available from Mocon, Inc.

An improvement (increase) in the oxygen barrier property of a material can be observed as a decrease in the oxygen transmission rate of the material. In one embodiment, the oxygen transmission rate of the coated article is decreased by at least 10% relative to that of the corresponding uncoated substrate. Alternatively, the oxygen transmission rate of the coated article can be decreased by at least 10%, 15%, 20%, 25%, 30%, 35%, 40%, 45%, 50%, 55%, 60%, 65%, 70%, 75% or more, relative to that of the corresponding uncoated substrate. In another embodiment, the oxygen transmission rate of the coated article under conditions of about 50% relative humidity can be decreased by at least 10%, 15%, 20%, 25%, 30%, 35%, 40%, 45%, 50%, 55%, 60%, 65%, 70%, 75%, relative to that of the corresponding uncoated substrate. Oxygen transmission rate can be measured as described in the Experimental Section herein.

As disclosed herein, the coating composition comprises a polysaccharide derivative. In one embodiment, the polysaccharide derivative is obtained from an enzymatically-produced polysaccharide, for example from poly alpha-1,3-glucan. In one embodiment, the polysaccharide derivative comprises a poly alpha-1,3-glucan ether compound represented by the structure:

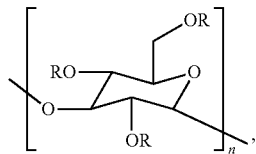

wherein
(i) n is at least 6,
(ii) each R is independently an H or an organic group, and
(iii) the compound has a degree of substitution of about 0.05 to about 3.0.

In one embodiment, the coating composition comprises a poly alpha-1,3-glucan ether compound as described herein. In another embodiment, the coating composition comprises a poly alpha-1,3-glucan ether compound and a poly alpha-1,3-glucan ester compound, as described herein below. Optionally, the coating composition can further comprise underivatized poly alpha-1,3-glucan polymer.

The terms "poly alpha-1,3-glucan", "alpha-1,3-glucan polymer" and "glucan polymer" are used interchangeably herein. Poly alpha-1,3-glucan means a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The alpha-1,3-glycosodic linkage of the poly alpha-1,3-glucan can be illustrated as follows:

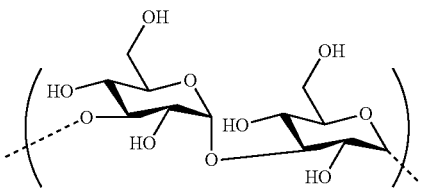

Poly alpha-1,3-glucan can be prepared using chemical methods. Alternatively, it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes (e.g., gtfJ), such as described in U.S. Pat. Nos. 7,000,000; 8,642,757; and 9,080,195 (the entirety of which are incorporated herein by reference), for example.

The "molecular weight" of poly alpha-1,3-glucan or a poly alpha-1,3-glucan compound as disclosed herein can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

In one embodiment, the coating composition comprises a polysaccharide derivative comprising a poly alpha-1,3-glucan ether compound represented by the structure:

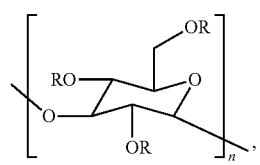

wherein n is at least 6, each R is independently an H or an organic group, and the ether compound has a degree of substitution (DoS) of about 0.05 to about 3.0. Mixtures of polysaccharide derivatives comprising ether compounds can also be used. Poly alpha-1,3-glucan ether compounds wherein n is at least 800, each R is independently an H or an organic group, and the ether compound has a degree of substitution of about 0.05 to about 3.0, and methods to prepare such ether compounds, are disclosed in U.S. Pat. No. 9,139,718, which is incorporated by reference herein in its entirety.

The degree of substitution (DoS) of a poly alpha-1,3-glucan ether compound disclosed herein can alternatively be about 0.2 to about 2.0. Alternatively still, the DoS can be at least about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. It would be understood by those skilled in the art that since a poly alpha-1,3-glucan ether compound herein has a degree of substitution between about 0.05 to about 3.0, and by virtue of being an ether, the R groups of the compound cannot only be hydrogen.

The percentage of glycosidic linkages between the glucose monomer units of poly alpha-1,3-glucan ether compounds herein that are alpha-1,3 is at least about 50%, 60%, 70%, 80%, 90%, 95%, 96%, 97%, 98%, 99%, or 100% (or any integer between 50% and 100%). In such embodiments, accordingly, the compound has less than about 50%, 40%, 30%, 20%, 10%, 5%, 4%, 3%, 2%, 1%, or 0% (or any integer value between 0% and 50%) of glycosidic linkages that are not alpha-1,3.

The backbone of a poly alpha-1,3-glucan ether compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ether compound in certain embodiments can have an n value of at least 6. Alternatively, n can have a value of at least 25, 50, 75, 100, 150, 200, 250, 300, 350, 400, 450, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 25 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The $M_n$ or $M_w$ of a poly alpha-1,3-glucan ether compound herein may be at least about 1000. Alternatively, the $M_n$ or $M_w$ can be at least about 1000 to about 600000. Alternatively still, the $M_n$ or $M_w$ can be at least about 2000, 3000, 4000, 5000, 6000, 7000, 8000, 9000, 10000, 15000, 20000, 25000, 30000, 35000, 40000, 45000, 50000, 75000, 100000, 150000, 200000, 250000, 300000, 350000, 400000, 450000, 500000, 550000, or 600000 (or any integer between 2000 and 600000), for example.

Each R group in the formula of the poly alpha-1,3-glucan ether compound can independently be an H or an organic group. An organic group may be an alkyl group such as a methyl, ethyl, propyl, butyl, pentyl, hexyl, heptyl, octyl, nonyl, or decyl group, for example.

Alternatively, an organic group may be a substituted alkyl group in which there is a substitution on one or more carbons of the alkyl group. The substitution(s) may be one or more hydroxyl, aldehyde, ketone, and/or carboxyl groups. For example, a substituted alkyl group may be a hydroxy alkyl group, dihydroxy alkyl group, or carboxy alkyl group.

Examples of suitable hydroxy alkyl groups include hydroxymethyl (—CH$_2$OH), hydroxyethyl (e.g., —CH$_2$CH$_2$OH, —CH(OH)CH$_3$), hydroxypropyl (e.g., —CH$_2$CH$_2$CH$_2$OH, —CH$_2$CH(OH)CH$_3$, —CH(OH)CH$_2$CH$_3$), hydroxybutyl, and hydroxypentyl groups. Other examples include dihydroxy alkyl groups (diols) such as dihydroxymethyl, dihydroxyethyl (e.g., —CH(OH)CH$_2$OH), dihydroxypropyl (e.g., —CH$_2$CH(OH)CH$_2$OH, —CH(OH)CH(OH)CH$_3$), dihydroxybutyl, and dihydroxypentyl groups.

Examples of suitable carboxy alkyl groups are carboxymethyl (—CH$_2$COOH), carboxyethyl (e.g., —CH$_2$CH$_2$COOH, —CH(COOH)CH$_3$), carboxypropyl (e.g., —CH$_2$CH$_2$CH$_2$COOH, —CH$_2$CH(COOH)CH$_3$, —CH(COOH)CH$_2$CH$_3$), carboxybutyl, and carboxypentyl groups.

Alternatively still, one or more carbons of an alkyl group can have a substitution(s) with another alkyl group. Examples of such substituent alkyl groups are methyl, ethyl and propyl groups. To illustrate, an R group can be —CH(CH$_3$)CH$_2$CH$_3$ or —CH$_2$CH(CH$_3$)CH$_3$, for example, which are both propyl groups having a methyl substitution.

As should be clear from the above examples of various substituted alkyl groups, a substitution (e.g., hydroxy or carboxy group) on an alkyl group in certain embodiments may be bonded to the terminal carbon atom of the alkyl group, where the terminal carbon group is opposite the terminus that is in ether linkage to the glucose group in the above formula. An example of this terminal substitution is the hydroxypropyl group —CH$_2$CH$_2$CH$_2$OH. Alternatively, a substitution may be on an internal carbon atom of an alkyl group. An example on an internal substitution is the hydroxypropyl group —CH$_2$CH(OH)CH$_3$. An alkyl group can have one or more substitutions, which may be the same (e.g., two hydroxyl groups [dihydroxy]) or different (e.g., a hydroxyl group and a carboxyl group).

Poly alpha-1,3-glucan ether compounds in certain embodiments may contain one type of organic group. For example, one or more R groups ether-linked to the glucose group in the above formula may be a methyl group; the R groups in this particular example would thus independently be hydrogen and methyl groups. Certain embodiments of poly alpha-1,3-glucan ether compounds containing only one type of organic group do not have a carboxy alkyl group (e.g., carboxymethyl group) as the organic group.

Alternatively, poly alpha-1,3-glucan ether compounds can contain two or more different types of organic groups. Examples of such compounds contain (i) two different alkyl groups as R groups, (ii) an alkyl group and a hydroxy alkyl group as R groups (alkyl hydroxyalkyl poly alpha-1,3-glucan, generically speaking), (iii) an alkyl group and a carboxy alkyl group as R groups (alkyl carboxyalkyl poly alpha-1,3-glucan, generically speaking), (iv) a hydroxy alkyl group and a carboxy alkyl group as R groups (hydroxyalkyl carboxyalkyl poly alpha-1,3-glucan, generically speaking), (v) two different hydroxy alkyl groups as R groups, or (vi) two different carboxy alkyl groups as R groups. Specific non-limiting examples of such compounds include ethyl hydroxyethyl poly alpha-1,3-glucan (i.e., where R groups are independently H, ethyl, or hydroxyethyl), hydroxyalkyl methyl poly alpha-1,3-glucan (i.e., where R groups are independently H, hydroxyalkyl, or methyl), carboxymethyl hydroxyethyl poly alpha-1,3-glucan (i.e., where R groups are independently H, carboxymethyl, or hydroxyethyl), and carboxymethyl hydroxypropyl poly alpha-1,3-glucan (i.e., where R groups are independently H, carboxymethyl, or hydroxypropyl). Certain embodiments of poly alpha-1,3-glucan ether compounds containing two or more different types of organic groups do not have a carboxy alkyl group (e.g., carboxymethyl group) as one of the organic groups.

In certain embodiments, the organic group can be a positively charged organic group, and each R group in the formula of a poly alpha-1,3-glucan ether compound herein can independently be an H or a positively charged organic group. Such alpha-1,3-glucan ether compounds and methods of preparing them are disclosed in published patent application WO 2015/095358, which is herein incorporated by reference in its entirety. With appropriate choice of the positively charged organic group and the degree of substitution of the glucan polymer, the alpha-1,3-glucan ether compound can be water soluble under certain conditions.

A positively charged organic group comprises a chain of one or more carbons having one or more hydrogens substituted with another atom or functional group, where one or more of the substitutions is with a positively charged group.

A positively charged group may be a substituted ammonium group, for example. Examples of substituted ammonium groups are primary, secondary, tertiary and quaternary ammonium groups. The terms "substituted ammonium group", "substituted ammonium ion" and "substituted ammonium cation" are used interchangeably herein. A substituted ammonium group herein comprises structure I:

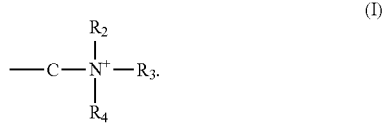

$R_2$, $R_3$ and $R_4$ in structure I each independently represent a hydrogen atom or an alkyl, aryl, cycloalkyl, aralkyl, or alkaryl group. The carbon atom (C) in structure I is part of the chain of one or more carbons ("carbon chain") of the positively charged organic group. The carbon atom is either directly ether-linked to a glucose monomer of poly alpha-1,3-glucan, or is part of a chain of two or more carbon atoms ether-linked to a glucose monomer of poly alpha-1,3-glucan. The carbon atom in structure I can be —$CH_2$—, —CH— (where a H is substituted with another group such as a hydroxy group), or —C— (where both H's are substituted).

The nitrogen atom in a substituted ammonium group represented by structure I is bonded to a chain of one or more carbons as comprised in a positively charged organic group. This chain of one or more carbons ("carbon chain") is ether-linked to a glucose monomer of poly alpha-1,3-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain herein.

Examples of a carbon chain of a positively charged organic group that do not have a substitution in addition to the substitution with a positively charged group include —$CH_2$—, —$CH_2CH_2$—, —$CH_2CH_2CH_2$—, —$CH_2CH_2CH_2CH_2$— and —$CH_2CH_2CH_2CH_2CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in structure I.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain herein having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include —CH(OH)—, —CH(OH)$CH_2$—, —C(OH)$_2$$CH_2$—, —$CH_2$CH(OH)$CH_2$—, —CH(OH)$CH_2CH_2$—, —CH(OH)CH(OH)$CH_2$—, —$CH_2CH_2$CH(OH)$CH_2$—, —$CH_2$CH(OH)$CH_2CH_2$—, —CH(OH)$CH_2CH_2CH_2$—, —$CH_2$CH(OH)CH(OH)$CH_2$—, —CH(OH)CH(OH)$CH_2CH_2$— and —CH(OH)$CH_2$CH(OH)$CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in structure I.

Examples of a carbon chain herein having one or more substitutions with an alkyl group include chains with one or more substituent methyl, ethyl and/or propyl groups. Examples of methylalkyl groups include —CH($CH_3$)$CH_2CH_2$— and —$CH_2$CH($CH_3$)$CH_2$—, which are both propyl groups having a methyl substitution. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in structure I.

Poly alpha-1,3-glucan ether compounds in certain embodiments disclosed herein may contain one type of positively charged organic group as an R group. For example, one or more positively charged organic groups ether-linked to the glucose monomer of poly alpha-1,3-glucan may be trimethylammonium hydroxypropyl groups; the R groups in this particular example would thus independently be hydrogen and trimethylammonium hydroxypropyl groups. Alternatively, poly alpha-1,3-glucan ether compounds disclosed herein can contain two or more different types of positively charged organic groups as R groups.

In one embodiment, the coating composition comprises a poly alpha-1,3-glucan ether compound, wherein at least one positively charged organic group comprises a substituted ammonium group. In one embodiment, the positively charged organic group comprises a trimethylammonium group. In another embodiment, the positively charged organic group is a quaternary ammonium group. In a further embodiment, at least one positively charged organic group comprises an alkyl group or hydroxy alkyl group. In yet another embodiment, at least one positively charged organic group is a quaternary ammonium hydroxypropyl group.

In one embodiment, the coated article comprises a substrate comprising polyethylene, and the coating composition comprises trimethylammonium hydroxypropyl poly alpha-1,3-glucan. In one embodiment, the coated article comprises a substrate comprising polypropylene, and the coating composition comprises trimethylammonium hydroxypropyl poly alpha-1,3-glucan. In one embodiment, the coated article comprises a substrate comprising poly lactic acid, and the coating composition comprises trimethylammonium hydroxypropyl poly alpha-1,3-glucan. In one embodiment, the coated article comprises a substrate comprising a polyester, and the coating composition comprises trimethylammonium hydroxypropyl poly alpha-1,3-glucan. In one embodiment, the coated article comprises a substrate comprising polyethylene terephthalate, and the coating composition comprises trimethylammonium hydroxypropyl poly alpha-1,3-glucan. In one embodiment, the coated article comprises a substrate comprising polytrimethylene terephthalate, and the coating composition comprises trimethylammonium hydroxypropyl poly alpha-1,3-glucan. In one embodiment, the coated article comprises a substrate comprising polyamide, and the coating composition comprises trimethylammonium hydroxypropyl poly alpha-1,3-glucan. In one embodiment, the coated article comprises a substrate comprising poly(trimethylene furandicarboxylate), and the coating composition comprises trimethylammonium hydroxypropyl poly alpha-1,3-glucan. In one embodiment, the coated article comprises a substrate comprising paper, and the coating composition comprises trimethylammonium hydroxypropyl poly alpha-1,3-glucan. In one embodiment, the coated article comprises a substrate comprising fabric, and the coating composition comprises trimethylammonium hydroxypropyl poly alpha-1,3-glucan.

In one embodiment, the coated article comprises a substrate comprising polyethylene, and the coating composition comprises hydroxypropyl poly alpha-1,3-glucan. In one embodiment, the coated article comprises a substrate comprising polypropylene, and the coating composition comprises hydroxypropyl poly alpha-1,3-glucan. In one embodiment, the coated article comprises a substrate comprising poly lactic acid, and the coating composition comprises hydroxypropyl poly alpha-1,3-glucan. In one embodiment, the coated article comprises a substrate comprising a polyester, and the coating composition comprises hydroxypropyl poly alpha-1,3-glucan. In one embodiment, the coated article comprises a substrate comprising polyethylene terephthalate, and the coating composition comprises hydroxypropyl poly alpha-1,3-glucan. In one embodiment, the coated article comprises a substrate comprising polytrimethylene terephthalate, and the coating composition comprises hydroxypropyl poly alpha-1,3-glucan. In one embodiment, the coated article comprises a substrate comprising polyamide, and the coating composition comprises hydroxypropyl poly alpha-1,3-glucan. In one embodiment, the coated article comprises a substrate comprising poly(trimethylene furandicarboxylate), and the coating composition comprises hydroxypropyl poly alpha-1,3-glucan. In one embodiment, the coated article comprises a substrate comprising paper, and the coating composition comprises hydroxypropyl poly alpha-1,3-glucan. In one embodiment, the coated article comprises a substrate comprising fabric, and the coating composition comprises hydroxypropyl poly alpha-1,3-glucan.

In one embodiment, the coated article comprises a substrate comprising polyethylene, and the coating composition comprises hydroxyethyl poly alpha-1,3-glucan. In one embodiment, the coated article comprises a substrate comprising polypropylene, and the coating composition comprises hydroxyethyl poly alpha-1,3-glucan. In one embodiment, the coated article comprises a substrate comprising poly lactic acid, and the coating composition comprises hydroxyethyl poly alpha-1,3-glucan. In one embodiment, the coated article comprises a substrate comprising a polyester, and the coating composition comprises hydroxyethyl poly alpha-1,3-glucan. In one embodiment, the coated article comprises a substrate comprising polyethylene terephthalate, and the coating composition comprises hydroxyethyl poly alpha-1,3-glucan. In one embodiment, the coated article comprises a substrate comprising polytrimethylene terephthalate, and the coating composition comprises hydroxyethyl poly alpha-1,3-glucan. In one embodiment, the coated article comprises a substrate comprising polyamide, and the coating composition comprises hydroxyethyl poly alpha-1,3-glucan. In one embodiment, the coated article comprises a substrate comprising poly(trimethylene furandicarboxylate), and the coating composition comprises hydroxyethyl poly alpha-1,3-glucan. In one embodiment, the coated article comprises a substrate comprising paper, and the coating composition comprises hydroxyethyl poly alpha-1,3-glucan. In one embodiment, the coated article comprises a substrate comprising fabric, and the coating composition comprises hydroxyethyl poly alpha-1,3-glucan.

It is contemplated that coating compositions comprising a polysaccharide derivative such as a poly alpha-1,3-glucan ester compound might also be used to provide improved oxygen barrier properties to coated substrates. It is thought that suitable poly alpha-1,3-glucan ester compounds may include those as disclosed in U.S. Pat. No. 9,278,988, which is incorporated herein by reference in its entirety. Such poly alpha-1,3-ester compounds can be represented by the following structure:

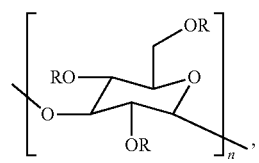

wherein (i) n is at least 6, (ii) each R is independently an H or acyl group, and (iii) the compound has a degree of substitution of about 0.05 to about 3.0. In some embodiments, the glucan ester compound could contain two or more types of the acyl group. The acyl group could comprise acetyl, propionyl, butyryl, pentanoyl, hexanoyl, heptanoyl, or octanoyl, for example. Methods of preparing such poly alpha-1,3-glucan esters are disclosed in U.S. Pat. No. 9,278,988.

It is contemplated that suitable poly alpha-1,3-glucan ester compounds might also include those having longer chain ester groups, for example palmitate or lauryl ester groups. In one embodiment, the coating composition may comprise a polysaccharide derivative comprising a poly alpha-1,3-glucan ester compound, wherein the ester compound comprises poly alpha-1,3-glucan laurate or poly alpha-1,3-glucan palmitate. Mixtures of polysaccharide derivatives comprising ester compounds could also be used.

The terms "poly alpha-1,3-glucan monoester" and "monoester" are used interchangeably herein. A poly alpha-1,3-glucan monoester contains one type of first group. The terms "poly alpha-1,3-glucan mixed ester" and "mixed ester" are used interchangeably herein. A poly alpha-1,3-glucan mixed ester contains two or more types of a first group.

It is thought that poly alpha-1,3-glucan ester compounds useful in preparing coating compositions as disclosed herein may have a degree of substitution of about 0.05 to about 3. Alternatively still, the DoS could be at least about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. The structure, molecular weight and DoS of a poly alpha-1,3-glucan ester product can be confirmed using various physiochemical analyses known in the art such as NMR spectroscopy and size exclusion chromatography (SEC).

A poly alpha-1,3-glucan ester compound can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the DPw (weight average degree of polymerization) or DPn (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

In one embodiment, the dried layer formed from the coating compositions disclosed herein comprises a polysaccharide derivative obtained from an enzymatically-produced polysaccharide comprising particles having an average particle size in at least one dimension in the range of from about 20 nm to about 200 µm (200,000 nm). For example, the average particle size in at least one dimension can be 20; 30; 40; 50; 60; 70; 80; 90; 100; 150; 200; 250; 300; 350; 400; 450; 500; 550; 600; 700; 800; 900; 1000; 1500; 2000; 2500; 5000; 7500; 10,000; 15,000; 20,000; 30,000; 40,000; 50,000; 60,000; 70,000; 80,000; 90,000; 100,000; 125,000; 150,000; 175,000; or 200,000 (or any value between 20 and 200,000) nm. In a further embodiment, the coating compositions can form a dried layer comprising particles having an average particle size in at least one dimension in the range of from about 20 nm to about 200 µm (200,000 nm) and an aspect ratio of about 1.

In another embodiment, the dried layer formed from the coating compositions disclosed herein comprises a polysaccharide derivative obtained from an enzymatically-produced polysaccharide comprising a nanostructured particles characterized by a surface area in the range of from about 0.1 $m^2/g$ to about 200 $m^2/g$, as determined by the Brunauer-Emmett-Teller (BET) measurement method. For example, the BET surface area can be 0.1, 0.2, 0.3, 0.4, 0.5, 0.6, 0.7, 0.8, 0.9, 1, 2, 3, 4, 5, 6, 7, 8, 9, 10, 15, 20 25, 30 35, 40 45, 50, 55, 60, 65, 70, 75, 80, 85, 90, 95, 100, 110, 120, 130, 140, 150, 160, 170, 180, 190, or 200 (or any value between 0.1 and 200) $m^2/g$.

The coating composition can further comprise one or more additives. Suitable additives can include, for example, binders, dispersants, quaternary ammonium salts, calcium chloride, calcium silicate; calcium carbonate; talc; kaolin; surfactants, for example, cationic surfactants, anionic surfactants, non-ionic surfactants, amphoteric surfactants, fluorinated surfactants; hardeners, for example, active halogen compounds, vinylsulfone compounds, epoxy compounds; dispersing agents, for example, polyacrylates, polyphosphates, polycarboxylates; flowability improvers; lubricants, for example, calcium, ammonium and/or zinc stearate, wax or wax emulsions, alkyl ketene dimer, glycols; antifoam agent, for example, octyl alcohol, silicone-based antifoam agents; releasing agents; foaming agents; penetrants, for example, 1,2-propane diol, triethyleneglycol butyl ether, 2-pyrrolidone; optical brighteners, for example, fluorescent whiteners; preservatives, for example, benzoisothiazolone and isothiazolone compounds; biocides, for example, metaborate, thiocyanate, sodium benzoate, benzisothiaolin-3-one; yellowing inhibitors, for example, sodium hydroxymethyl sulfonate, sodium p-toluenesulfonate; ultraviolet absorbers, for example, benzotriazole compounds; antioxidants, for example, sterically hindered phenol compounds; insolubilisers; antistatic agents; pH regulators, for example, weak bases, primary, secondary or tertiary amines, sulfuric acid, hydrochloric acid; water-resistance agents, for example, ketone resin, anionic latex, glyoxal; wet and/or dry strengthening agents, for example, glyoxal based resins, oxidized polyethylenes, melamine resins, urea formaldehyde; cross-linking agents; gloss-ink holdout additives; grease and oil resistance additives; leveling aids, for example, polyethylene emulsions, alcohol/ethylene oxide or combinations thereof. The coating composition can contain any one or more of the listed additives in an amount in the range of from about 0 to 5% by weight, based on the total amount of the coating composition, as long as the additive does not have a deleterious effect on the oxygen barrier properties of the coating composition. In other embodiments, the additives can be present in an amount in the range of from 0.1 to 4% by weight or 0.5 to 3.5% by weight or 0.5 to 3% by weight. All percentages by weight are based on the total amount of the coating composition.

In some embodiments, the coating composition further comprises a binder. Suitable binders can include, for example, polyvinyl alcohol, polyvinyl acetate, partially saponified polyvinyl acetate, silanol-modified polyvinyl alcohol, polyurethane, starch, corn dextrin, carboxy methyl cellulose, cellulose ethers, hydroxyethyl cellulose, hydroxypropyl cellulose, ethylhydroxyethyl cellulose, methyl cellulose, alginates, sodium alginate, xanthan, carrageenan, casein, soy protein, guar gums, synthetic polymers, styrene butadiene latex, styrene acrylate latex, or a combination thereof. In some embodiments, the binder is polyvinyl alcohol. In other embodiments, the binder is a combination of two or more of polyvinyl alcohol, a silanol-modified polyvinyl alcohol, and polyvinyl acetate.

The coating composition can contain any one or more of the binders listed herein above in an amount in the range of from 0 to 20% by weight, based on the total amount of the coating composition, as long as the binder does not have a deleterious effect on the oxygen barrier properties of the coating composition. Alternatively, the coating composition can contain one or more binders in an amount of about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, or 20 percent by weight, based on the total amount of the coating composition. In other embodiments, the binder can be present in an amount in the range of from 0.1 to 4% by weight or 0.5 to 3.5% by weight or 0.5 to 3% by weight. All percentages by weight are based on the total amount of the coating composition.

In some embodiments, the coating composition is free from any binder. In other embodiments, the coating composition is essentially free from starch, hydroxyalkyl starch, or modified starch. As used herein, the phrase "essentially free from" means that the coating composition contains less than 1% by weight of the component, or less than 0.5% by weight or less than 0.1% by weight or less than 0.01% by weight of the component. In still further embodiments, "essentially free from" means that the particular component is undetectable by $^1$H NMR analysis.

The coated articles disclosed herein may be used to make multilayer composite films or composite packaging. In certain embodiments, the coated article may further comprise an adhesive layer disposed between the coating composition and the substrate. Materials useful as the adhesive layer can include a polyurethane dispersion, solvent-based acrylics, emulsions such as vinyl acetate, acrylic, polyurethane, aqueous polyvinyl alcohol, ethylene vinyl acetate copolymers, high solids silicone solvents, modified polyolefins such as low density polyethylene, polyesters such as polyethylene terephthalate, synthetic rubber, natural rubber, acrylic rubber, modified starch, dextrin, latex, ionomers, or combinations thereof.

Adhesive layers can be applied using standard dry and wet bond lamination techniques using wire rods, knife rolls, gravure rolls, reverse rolls, slot die, and curtain coating as well as extruder coating lamination. The present disclosure also relates to a method of forming a layer of a coating composition on a substrate to provide a coated article, the method comprising the steps:

1) providing a solution of a coating composition comprising a solvent and a polysaccharide derivative as disclosed herein;
2) applying a layer of the solution of coating composition to at least a portion of at least one surface of the substrate; and
3) removing at least a portion of the solvent from the applied layer to form a dried layer of coating composition;

wherein the coating composition forms a substantially continuous layer on the substrate, and the coating composition is present in an amount sufficient to increase the oxygen barrier property of the substrate.

The coating composition can be prepared by adding the polysaccharide derivative, for example a poly alpha-1,3-glucan ether compound and/or a poly alpha-1,3-glucan ester compound, to water or a suitable organic solvent and agitating until a solution forms. Suitable solvents can include acetone, tetrahydrofuran, methyl ethyl ketone, toluene, ethyl acetate, n-propyl acetate, isopropanol, ethanol, 1-propanol, or hexane. The polysaccharide derivative can be present in the range of from 0.1 to 50% by weight, based on the total weight of the coating composition solution. In one embodiment the polysaccharide derivative can be present in the range of from 5 to 30% by weight, based on the total weight of the coating composition solution. When the polysaccharide derivative is present at less than about 5% by weight, the continuous film forming ability of the coating composition is diminished, and when the concentration is above 30% by weight, then the viscosity of the coating composition solution increases to the point that it becomes difficult to form a uniform layer of the substrate. In other embodiments, the polysaccharide derivative can be present in the coating composition solution in the range of from 1 to 30% or 2 to 25% or 2 to 20% by weight, wherein the percentage by weight is based on the total weight of the coating composition solution.

In any given embodiment, the solubility limit of the polysaccharide derivative in the solvent, for example water, is a function of the molecular weight of the polysaccharide derivative, the duration of mixing, the viscosity of the solution as it is being formed, the shear forces to which the solution is subject, and the temperature at which mixing takes place. In general, lower molecular weight glucan ether compounds and lower molecular weight glucan ester compounds will be more soluble than the corresponding higher molecular weight analogues, other things being equal. In general, more highly substituted ether compounds and more highly substituted ester compounds become more soluble, both in increasing the solids loading in a solvent as well as being soluble in a wider range of solvents, than the corresponding lower substituted analogues, other things being equal. Generally, higher shear mixing, longer mixing time, and higher temperature will be associated with higher solubility. The maximum temperature for mixing is limited by the boiling point of the solvent used.

If desired, additives and/or binders can be added at any point of the process of forming the solution of coating composition. The additives can be dispersed and/or dissolved in the water or solvent before the polysaccharide derivative is added, during the addition of the polysaccharide derivative, or after the addition of the polysaccharide derivative.

The layer of coating composition can be applied to at least a portion of the substrate. In some embodiments, the layer can be applied via any method known in the art, for example, air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating, and transfer roll coating. The solution of coating composition can be applied on at least a portion of the substrate, for example, on a single side or both sides of the substrate, a portion of a single side, or a portion of both sides of a flat substrate. The solution of coating composition can be applied once to the substrate or multiple times to the substrate.

After application of the layer of the coating composition solution to at least a portion of the substrate, at least a portion of the water or solvent can be removed from the applied layer of coating composition to produce the continuous layer of coating composition. The water or solvent can be removed by evaporation, heating, or a combination thereof. For example, air or convection drying, linear tunnel drying, arc drying, air-loop drying, contact or conduction drying, radiant energy drying, infrared drying, microwave drying, or a combination thereof may be used. The coated substrate can optionally be calendared after drying in order to improve the surface smoothness and gloss. Calendaring can be carried out by passing the coated substrate through nips and rollers one or more times.

Non-limiting examples of the embodiments disclosed herein include:

1. A coated article comprising:
   a substrate having at least one surface; and
   a coating composition disposed in a substantially continuous layer on at least one surface of the substrate, wherein the coating composition is present in an amount sufficient to increase the oxygen barrier property of the substrate, and the coating composition comprises a polysaccharide derivative.
2. The coated article of embodiment 1, wherein the substrate is paper, a polymer, leather, or a textile.
3. The coated article of embodiment 1 or 2, wherein the substrate is a polymer.
4. The coated article of embodiment 3, wherein the substrate is a polymer and the polymer comprises polyethylene, polypropylene, poly lactic acid, poly(ethylene terephthalate), poly(trimethylene terephthalate), polyamide, or poly(trimethylene furandicarboxylate).

5. The coated article of embodiment 1 or 2, wherein the substrate is paper.

6. The coated article of embodiment 1, 2, 3, 4, or 5, wherein the layer of coating composition forms a dried layer having a thickness in the range of from 0.1 micrometers to 50 micrometers.

7. The coated article of embodiment 1, 2, 3, 4, 5, or 6, wherein the oxygen barrier property is increased by at least 10% relative to that of the corresponding uncoated substrate.

8. The coated article of embodiment 1, 2, 3, 4, 5, 6, or 7, wherein the polysaccharide derivative comprises a poly alpha-1,3-glucan ether compound represented by the structure:

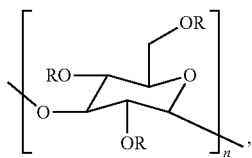

wherein
(i) n is at least 6,
(ii) each R is independently an H or an organic group, and
(iii) the compound has a degree of substitution of about 0.05 to about 3.0.

9. The coated article of embodiment 8, wherein at least one organic group comprises a hydroxymethyl, a hydroxyethyl, or a hydroxypropyl group.

10. The coated article of embodiment 8, wherein the organic group is a positively charged organic group.

11. The coated article of embodiment 8, wherein the positively charged organic group comprises a trimethylammonium group.

12. The coated article of embodiment 8, wherein the positively charged organic group is a quaternary ammonium group.

13. The coated article of embodiment 8, wherein at least one positively charged organic group comprises an alkyl group or hydroxy alkyl group.

14. The coated article of embodiment 8, wherein at least one positively charged organic group is a quaternary ammonium hydroxypropyl group.

15. The coated article of embodiment 8, wherein at least one positively charged organic group comprises a substituted ammonium group.

16. The coated article of embodiment 1, 2, 3, 4, 5, 6, 7, 8, 9, 10, 11, 12, 13, 14, or 15, wherein the polysaccharide derivative is obtained from an enzymatically-produced polysaccharide.

17. The coated article of embodiment 1, 2, 3, 4, 5, 6, 7, 8, 9, 10, 11, 12, 13, 14, 15, or 16, wherein the enzymatically-produced polysaccharide comprises particles having an average particle size in at least one dimension in the range of from about 20 nm to about 200 μm.

18. The coated article of embodiment 1, 2, 3, 4, 5, 6, 7, 8, 9, 10, 11, 12, 13, 14, 15, 16, or 17, wherein the enzymatically-produced polysaccharide comprises nanostructured particles characterized by a surface area in the range of from about 0.1 m$^2$/g to about 200 m+/g, as determined by Brunauer-Emmett-Teller measurement method.

19. The coated article of embodiment 1, 2, 3, 4, 5, 6, 7, 8, 9, 10, 11, 12, 13, 14, 15, 16, 17, or 18, wherein the coating composition is essentially free from starch, hydroxyalkyl starch, or modified starch.

20. The coated article of embodiment 1, 2, 3, 4, 5, 6, 7, 8, 9, 10, 11, 12, 13, 14, 15, 16, 17, 18, or 19, wherein the coating composition further comprises one or more additives.

21. The coated article of embodiment 1, 2, 3, 4, 5, 6, 7, 8, 9, 10, 11, 12, 13, 14, 15, 16, 17, 18, 19, or 20, further comprising an adhesive layer disposed between the coating composition and the substrate.

22. Packaging comprising the coated article of embodiment 1, 2, 3, 4, 5, 6, 7, 8, 9, 10, 11, 12, 13, 14, 15, 16, 17, 18, 19, 20, or 21.

23. A packaged article comprising the packaging of embodiment 22.

24. The packaged article of embodiment 23, wherein the packaged article is food.

EXAMPLES

Unless otherwise stated, all materials are available from Sigma-Aldrich, St. Louis, Mo. Mylar® 48 gauge LBT polyethylene was obtained from the DuPont Company.

Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Preparation of Trimethylammonium Hydroxypropyl Poly Alpha-1,3-Glucan

The coating compositions of the Examples contained water soluble quaternary ammonium poly alpha-1,3-glucan, specifically trimethylammonium hydroxypropyl poly alpha-1,3-glucan. Quaternary ammonium poly alpha-1,3-glucans and their preparation are described in published patent applications WO 2015/095358 and WO 2015/195960, both of which are herein incorporated by reference in their entirety.

The trimethylammonium hydroxypropyl poly alpha-1,3-glucan used in Examples 2A, 2B, 3A, and 3B, which had a DoS of 0.6, was prepared similarly to the procedure of Example 1 in WO 2015/095358. On a dry weight basis, the weight/weight ratio of poly alpha-1,3-glucan solids to 3-chloro-2-hydroxypropyl-trimethylammonium chloride etherification agent used was 0.76. After 3-chloro-2-hydroxypropyl-trimethylammonium chloride addition, the reaction mixture was held at 60° C. for 4 hours before being neutralized with hydrochloric acid.

The trimethylammonium hydroxypropyl poly alpha-1,3-glucan used in Examples 1A and 1B had a DoS of 0.7 and was prepared similarly to the procedure of Example 1 in WO 2015/095358. On a dry weight basis, the weight/weight ratio of poly alpha-1,3-glucan solids to 3-chloro-2-hydroxypropyl-trimethylammonium chloride etherification agent used was 0.47. After 3-chloro-2-hydroxypropyl-trimethylammonium chloride addition, the reaction mixture was held at 60° C. for 4 hours before being neutralized with hydrochloric acid.

Test Methods

Thickness of the coated and uncoated substrates was obtained using an Olympus Manga Mike 8600 or a Federal 22P-10 micrometer.

Oxygen transmission rate (OTR) is the steady state rate at which oxygen gas permeates through a film at specified conditions of temperature and relative humidity. OTR of the coated and uncoated substrates was determined according to ASTM F-1927-07 standard using a MOCON OX-TRAN 2/61 testing system, available from Mocon, Inc. Minneapolis, Minn. OTR of the coated and uncoated substrates was measured at 50% and at 80% relative humidity (RH). Samples were submitted in duplicate. Orientation of the coated substrate with respect to the relative humidity is indicated in the Examples.

Coating weight was obtained by coating the substrate with a specific Meyer rod and allowing the coating to dry in the oven. Three identical samples were cut out of the coated substrate and weighed. The coating was then washed off using water and then weighed again. The average difference in weight between the coated substrate and uncoated substrate is the coating weight and is accepted as the coat weight for the same coating conditions. Coating conditions include wt % of coating solution and Meyer rod size used.

Comparative Examples A and B

Uncoated Mylar® 48 gauge LBT polyethylene substrate was used in Comparative Examples A and B, which were duplicates. OTR for the uncoated polyethylene substrate is reported in Table 1.

Examples 1A-3B

Preparation of Water Soluble Cationic Glucan Ether Coating Composition and Coating of Substrate A 8-10 wt % solution of quaternary ammonium alpha-1,3-glucan ether, prepared as described above, in deionized $H_2O$ was mixed in a beaker with an overhead stirrer for 2 hours. The solution was centrifuged to remove bubbles, poured onto a Mylar® 48 gauge LBT PET substrate having a thickness of 0.5 mil, and cast using a Meyer rod. The coated substrate was transferred to an oven and dried for 2-5 minutes at 80° C. until the coating was dry.

Examples 1A and 1B used poly alpha-1,3-glucan ether having a DoS of 0.7. Examples 2A and 2B used poly alpha-1,3-glucan ether having a DoS of 0.6, and at the same coating weight as Examples 1A and 1B. Examples 3A and 3B used poly alpha-1,3-glucan ether having a DoS of 0.6 but at a lower coating amount. During the OTR measurements, the coated side of the substrate was oriented such that it faced away from the relative humidity. OTR results are shown in Table 1.

TABLE 1

Results for Comparative Examples A and B, and Examples 1A, 1B, 2A, 2B, 3A, and 3B.

| Example | DoS of PS in Coating Composition | Weight of Coating (g/m$^2$) | Substrate Thickness (mil) | Coating Thickness (mil) | OTR at 50% RH (cc/[m$^2$ * day]) | OTR at 80% RH (cc/[m$^2$ * day]) |
|---|---|---|---|---|---|---|
| Comp. Ex. A | none (control) | 0 | 0.48 | 0 | 113.04 | 105.67 |
| Comp. Ex. B | none (control) | 0 | 0.48 | 0 | 121.79 | 111.36 |
| 1A | 0.7 | 1.56 | 0.48 | 0.27 | 1.62 | 3.24 |
| 1B | 0.7 | 1.56 | 0.48 | 0.27 | 2.23 | 4.85 |
| 2A | 0.6 | 1.56 | 0.48 | 0.22 | 2.15 | 3.01 |
| 2B | 0.6 | 1.56 | 0.48 | 0.22 | 3.13 | 3.66 |
| 3A | 0.6 | 0.85 | 0.48 | 0.12 | 4.17 | 4.05 |
| 3B | 0.6 | 0.85 | 0.48 | 0.12 | 4.6 | 5.18 |

The results in Table 1 show that the coating compositions of the Examples improved the oxygen barrier performance of the PET substrate, even at conditions of higher relative humidity. The measured oxygen transmission rates (OTR) for Examples 1A, 1B, 2A, 2B, 3A, and 3B were much lower than those of the uncoated substrate (Comparative Examples A and B) at both 50% and 80% relative humidity.

Comparative Example C

Uncoated Mylar® 92 gauge LBT polyester substrate was used in Comparative Example C. OTR results at 50 and 80% relative humidity are reported in Table 2.

Examples 4A-6B

Quaternary ammonium alpha-1,3-glucan ether with a DOS of 0.61, prepared as described above, was dissolved at 8 wt % into deionized water. The Mylar® substrate was treated with an inline corona treater and coated with the quaternary ammonium alpha-1,3-glucan ether solution that was heated to 35° C. using a Harrison-Bruno applicator with various gravure roll patterns to apply different amounts of coating to the substrate. For Examples 4A and 4B a 120QRF gravure roll was used; for Examples 5A and 5B a 60TH roll was used; and for Examples 6A and 6B a 23TH roll. The corona treatment was set to 1.4 watt/min/ft$^2$ and the gap was set to 140%. The coated substrate was then dried in a 3-zone oven at a minimum of 115° C. The pilot coater was running at 60 m/min. Conditions of each coating are reported in Table 2.

Coated substrates were testing against increasing relative humidity conditions. In the Table below, the orientation ("orient.") of the coated side of the substrate with respect to the relative humidity during testing is indicated by "Down" to indicate that the coated side of the substrate was facing away from the relative humidity or by "Up" to indicate the coated side of the substrate was exposed to the relative humidity. Column heading "Thickness" refers to the thickness of the coating plus substrate, except that for Comparative Example C, thickness refers to the uncoated substrate. The OTR results are shown in Table 2.

TABLE 2

Coating Conditions and OTR Results for Comparative Example C and Examples 4A through 6B

| Example | Coating weight (g/m$^2$) | Drying Temp (° C.) | Coating Orient. | Thickness (mil) | OTR at 0% RH (cc/[m$^2$ * day]) | OTR at 50% RH (cc/[m$^2$ * day]) | OTR at 80% RH (cc/[m$^2$ * day]) |
|---|---|---|---|---|---|---|---|
| Comp. Ex. C | 0 | n/a | n/a | 0.98 | n/a | 62 | 59 |
| 4A | 0.5 | 193 | Down | 1 | 11.02 | 11.65 | 10.1 |
| 4B | 0.5 | 193 | Down | 1.01 | 11 | 12.57 | 11.02 |
| 4A | 0.5 | 193 | Up | 0.98 | 9.29 | 57.9 | 55.59 |
| 4B | 0.5 | 193 | Up | 1 | 9.77 | 59.39 | 57.01 |
| 5A | 2.2 | 177 | Down | 0.97 | 2.52 | 3.95 | 3.96 |
| 5B | 2.2 | 177 | Down | 1.02 | 2.75 | 3.93 | 3.93 |
| 5A | 2.2 | 177 | Up | 1.01 | 2.03 | 58 | 58.51 |
| 5B | 2.2 | 177 | Up | 1.03 | 2.38 | 59.2 | 59.72 |
| 6A | 5.2 | 177 | Down | 1.1 | 0.92 | 2.29 | 2.81 |
| 6B | 5.2 | 177 | Down | 1.11 | 1.28 | 2.82 | 3.03 |
| 6A | 5.2 | 177 | Up | 1.1 | 0.58 | 55.59 | 56.16 |
| 6B | 5.2 | 177 | Up | 1.1 | 0.67 | 56.07 | 55.78 |

"n/a" means not available

Comparative Examples D and E

Two sets of uncoated Mylar® 92 gauge LBT polyester substrates were stacked on top of each other and pressed using a hot press to laminate them together at 149° C.; these were used as Comparative Examples C and D. OTR results for the uncoated laminated polyesters are reported in Table 3.

Examples 7A-9B

Substrates of Mylar® 92 gauge LBT that were coated with various coating weights of quaternary ammonium alpha-1,3-glucan ether (the same material as used in Examples 4-6) were then laminated together using a pilot lab heated roll at 150° C. and 70 PSI (483 kPa) of pressure. The rolls were laminated at 6 m/min with a 33-cm footprint. The coated substrates were laminated with the coated sides facing each other to form a "sandwich"-like structure. OTR results for the coated laminated examples are reported in Table 3.

TABLE 3

Results for Comparative Examples C and D, and Examples 7A, 7B, 8A, 8B, 9A, and 9B.

| Example | Laminate Thickness (mil) | Total coating wt. (g/m$^2$) | OTR at 0% RH (cc/[m$^2$ * day]) | OTR at 50% RH (cc/[m$^2$ * day]) | OTR at 80% RH (cc/[m$^2$ * day]) |
|---|---|---|---|---|---|
| Comp. Ex. D | 1.84 | 0 | n/a | 20.593 | n/a |
| Comp. Ex. E | 1.84 | 0 | n/a | 15.314 | n/a |
| 7A | 2.2 | 1 | 2.494 | 8.023 | 22.686 |
| 7B | 2.22 | 1 | 2.637 | 8.305 | 22.993 |
| 8A | 2.2 | 7.4 | 2.016 | 7.052 | 20.312 |
| 8B | 2.24 | 7.4 | 2.178 | 7.023 | 20.652 |
| 9A | 2.3 | 10.4 | 0.653 | 4.392 | 17.718 |
| 9B | 2.34 | 10.4 | 1.215 | 4.619 | 17.780 |

"n/a" means not available

What is claimed is:

1. A coated article comprising:
a substrate having at least one surface; and
a coating composition disposed in a substantially continuous layer on said at least one surface of the substrate, wherein the coating composition is present in an amount sufficient to increase the oxygen barrier property of the substrate, and the coating composition comprises a polysaccharide derivative poly alpha-1,3-glucan ether compound represented by the structure:

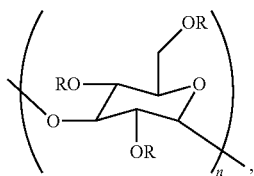

wherein
(i) n is at least 6,
(ii) each R is independently an H or organic group, and
(iii) the compound has a degree of substitution of about 0.05 to about 3.0.

2. The coated article of claim 1, wherein the substrate is a paper, polymer, leather, or textile.

3. The coated article of claim 2, wherein substrate is the polymer, and the polymer comprises polyethylene, polypropylene, poly lactic acid, poly(ethylene terephthalate), poly(trimethylene terephthalate), polyamide, or poly(trimethylene furandicarboxylate).

4. The coated article of claim 1, wherein the layer of coating composition having is dry and has a thickness of 0.1 to 50 micrometers.

5. The coated article of claim 1, wherein the oxygen barrier property is increased by at least 10% relative to the oxygen barrier property of a corresponding uncoated substrate.

6. The coated article of claim 1, wherein the poly alpha-1,3-glucan ether compound:
has a degree of substitution of about 0.2 to about 2.0.

7. The coated article of claim 1, wherein at least one organic group comprises a hydroxymethyl, hydroxyethyl, or hydroxypropyl group.

8. The coated article of claim 1, wherein at least one organic group is a positively charged organic group.

9. The coated article of claim 8, wherein the positively charged organic group comprises a trimethylammonium group.

10. The coated article of claim 8, wherein the positively charged organic group is a quaternary ammonium group.

11. The coated article of claim 8, wherein the positively charged organic group comprises an alkyl group or hydroxy alkyl group.

12. The coated article of claim 11, wherein the positively charged organic group is a quaternary ammonium hydroxypropyl group.

13. The coated article of claim 1, further comprising an adhesive layer disposed between the coating composition and the substrate.

14. Packaging comprising the coated article of claim 1.

15. An article packaged in the packaging of claim 14.

16. The article of claim 15, wherein the article is a food.

* * * * *